United States Patent [19]

Kindell et al.

[11] Patent Number: 5,884,028

[45] Date of Patent: Mar. 16, 1999

[54] SYSTEM FOR THE MANAGEMENT OF MULTIPLE TIME-CRITICAL DATA STREAMS

[75] Inventors: Craig N. Kindell, Delray Beach; Kenneth L. Milsted, Boca Raton; Michael P. Vogt, Boca Raton; Susan E. Waefler, Delray Beach; Brian E. Yoder, Boca Raton, all of Fla.

[73] Assignee: International Business Machines Corporation, Armonk, N.Y.

[21] Appl. No.: 283,030

[22] Filed: Jul. 29, 1994

[51] Int. Cl.[6] ....................................................... G06F 13/00
[52] U.S. Cl. ............... 395/200.09; 395/154; 395/200.19; 348/8
[58] Field of Search .......................... 395/200.01–200.21, 395/153, 154; 348/8; 398/600, 650

[56] References Cited

U.S. PATENT DOCUMENTS

| 4,305,131 | 12/1981 | Best ......................................... 364/521 |
| 4,760,390 | 7/1988 | Maine et al. ............................. 340/747 |
| 4,779,092 | 10/1988 | Takao .................................. 340/828.52 |
| 4,847,698 | 7/1989 | Freeman ................................. 358/343 |
| 4,847,700 | 7/1989 | Freeman ................................. 358/343 |
| 4,847,829 | 7/1989 | Tompkins et al. ........................ 370/62 |
| 4,893,326 | 1/1990 | Duran et al. ............................. 379/53 |
| 4,920,432 | 4/1990 | Eggers et al. .......................... 360/33.1 |
| 4,998,248 | 3/1991 | Matsuzaki ............................ 370/110.1 |
| 5,001,628 | 3/1991 | Johnson et al. ........................ 395/600 |
| 5,027,400 | 6/1991 | Baji et al. ................................. 380/20 |
| 5,079,627 | 1/1992 | Filo ......................................... 358/85 |
| 5,202,957 | 4/1993 | Serrao ...................................... 379/53 |
| 5,208,665 | 5/1993 | McCalley et al. ........................ 358/86 |
| 5,220,420 | 6/1993 | Hoarty et al. ............................. 358/86 |
| 5,237,648 | 8/1993 | Mills et al. .............................. 395/133 |
| 5,262,875 | 11/1993 | Mincer et al. ........................... 358/335 |
| 5,276,681 | 1/1994 | Tobagi et al. .......................... 370/85.4 |
| 5,283,819 | 2/1994 | Glick et al. ............................... 379/90 |
| 5,353,398 | 10/1994 | Kitahara et al. ........................ 395/153 |
| 5,361,091 | 11/1994 | Hoarty et al. .............................. 348/7 |
| 5,404,446 | 4/1995 | Bowater et al. ......................... 395/162 |
| 5,406,322 | 4/1995 | Port et al. ................................. 348/15 |
| 5,434,994 | 7/1995 | Shaheen et al. ........................ 395/500 |
| 5,442,390 | 8/1995 | Hooper et al. ............................. 348/7 |
| 5,442,749 | 8/1995 | Northcutt et al. ................. 395/200.09 |
| 5,446,496 | 8/1995 | Foster et al. ............................ 348/441 |
| 5,452,299 | 9/1995 | Thessin et al. ........................... 370/62 |
| 5,452,447 | 9/1995 | Nelson et al. .......................... 395/650 |
| 5,461,415 | 10/1995 | Wolf et al. ................................. 348/7 |
| 5,475,685 | 12/1995 | Garris et al. .............................. 370/82 |
| 5,477,542 | 12/1995 | Takahara et al. ...................... 370/94.1 |

OTHER PUBLICATIONS

IBM Technical Disclosure Bulletin, vol. 34 No. 7A, Dec. 1991 pp. 385, 386, *Automatic Multiple Source Selection in a Video Conference.*

Primary Examiner—Christopher B. Shin
Attorney, Agent, or Firm—Bruce D. Jobse; Paul E. Kudirka; Richard A. Tomlin

[57] ABSTRACT

A networked computer system for storing and presenting multimedia data distributes that data among multiple storage devices of the system. The system includes a plurality of computers, each of which supports at least one viewing station. Each viewing station has access to any file on any of the storage devices and can retrieve and display any file on demand. To provide an efficient system and, at the same time, reduce the probability that the viewing of multimedia data may be interrupted, the system allocates resources, prioritizes access to files, and buffers data prior to the data's delivery to video adapters.

10 Claims, 9 Drawing Sheets

SYSTEM FOR THE MANAGEMENT OF MULTIPLE TIME-CRITICAL DATA STREAMS

FIELD OF THE INVENTION

This invention relates generally to systems for delivering high volumes of time-critical data and, more specifically, to the management of multimedia data streams within distributed computer systems. Multimedia data typically comprises digitized, compressed video and audio signals used for displaying "clips", or samples, of multimedia information such as motion pictures.

BACKGROUND OF THE INVENTION

At one time, computer systems which served a number of users and provided high-volume data storage typically stored the data in a single, centralized storage device which was controlled by a large, "mainframe" computer that acted as a dedicated "server" for controlling the storage device and processing data. The data was supplied to users through terminals which provided access to the central storage device through the mainframe computer. Computer-system architectures have evolved over the years and today a typical computer system employs local processors, such as personal computers and workstations, which not only retrieve data from a central location, but also store the data locally.

Although each local processor may access one or more of the local storage devices to obtain data, such a system may still employ a large central storage facility which often includes a dedicated computer that acts as a server to provide data requested by individual users attached to the computer system. Each user accesses this central facility by downloading data from it to an associated local storage and then retrieving the data from the local storage.

Distributed storage systems are, generally, a more complex arrangement than centralized storage systems because data retrieval must be coordinated between several storage devices, but distributed system do have advantages. For example, in distributed systems, data may be retrieved by a local processing device more quickly from a local storage device than from a remote storage device. Further, computers are typically "bundled", or sold as a package, together with components such as disk (local storage) and local area network (LAN) adapters. These bundled components find only limited use in a centralized system, but distributed systems make greater use of these "existing" system resources, thereby increasing the efficiency and cost-effectiveness of a distributed system when compared to a centralized system. In addition, distributed systems sometimes exhibit a price/performance advantage over centralized systems, e.g. five 200 MFLOP (million floating point operations per second) computers may be less expensive than one 1000 MFLOP computer. Finally, in a centralized system, the input/output (I/O) capability of the centralized server may be a significant factor which limits system performance by creating a "bottleneck" for data flow. In general, storage server I/O capability is less of a limitation for distributed systems because many more servers are available to handle the data flow.

Due to these advantages, distributed computer-system architectures are very common, however, even in these systems, data residing on remote storage devices may require more time to retrieve than data residing on an associated, or local, storage device. In addition, delays in retrieving data from a remote storage device may be lengthened if the data handling capability or "throughput" of any device or facility along the data retrieval path is limited. For example, in distributed systems where the terminals and data storage devices are interconnected by a LAN, a potentially high data transfer rate may, in fact, be limited by the total throughput capability of the LAN or the throughput capability of one, critical, LAN adapter. Also, if data is not distributed among several distributed storage devices in the most advantageous manner, one or more computers may become overloaded while their network partners are idle, thereby causing additional delays.

For most computer applications, the difference in retrieval time between the local and remote devices is not an impediment to successful operation because the end user will not notice this difference. However, delays in accessing remote storage may hinder the use of such a distributed storage system for time-critical applications such as distributed multi-media presentation systems.

In one example of such a distributed multi-media presentation system, segments of digitized video information and digitized audio information together comprise a small portion of a motion picture called a video "clip" which can viewed as a preview of an entire motion picture video cassette. A number of these clips corresponding to different motion pictures may be simultaneously displayed on a number of viewing terminals located in a video store. The clip information may be distributed across the local storage devices associated with the viewing terminals in such a manner that each local storage device contains some fraction of the total number of video clips contained within the system. The storage devices and terminals are connected together by a network so that video and audio information can be continuously read from storage devices and delivered to video playback adapters in the terminals, where screens, or frames of data, are displayed at a rate sufficient to appear as full-motion video on the display (typically 30 frames per second).

Such a system is time-critical because, if video data is not continuously available to a video adapter, the displayed video clip will appear to repeatedly halt temporarily, thus giving an annoying, "jerky", visual appearance to the clip due to video breakup. Interruptions in the accompanying audio signals can be even more annoying than the video breakup.

Attempts have been made to produce multimedia presentation systems which provide distributed storage of video clips. For example, one prior art system comprises a number of computers, each with a local, direct access storage device such as a magnetic disk drive, a compact disk read only memory (CDROM) drive or another digital data storage device. All the computers are attached to a LAN over which they exchange multi-media data. All but one of the computers provide a user interface in the form of a viewing station which comprises an input device, such as a keyboard, for viewer requests and output devices, such as a computer screen and a speaker, for video display and audio output, respectively. The remaining computer controls a large-scale storage device and acts as a video data server for the others.

In the latter known system, the video clip information is not distributed evenly across all of the computers. Instead, small numbers of clips are stored in each local storage device while the video server computer stores the bulk of the video clips and handles all video clip requests that cannot be handled locally. That is, when a viewing station requests information regarding a video clip which is not stored on the local storage device associated with the computer which supports the viewing station, a request is made to the video server which thereupon retrieves the data from its own large-scale storage device and delivers the data to the viewing station's local computer over the LAN.

However, with this prior art arrangement, the video server must handle remote requests from all the computer viewing stations on the system and, consequently, the video server must have significantly greater processing power and higher capacity input/output (I/O) subsystems than the other system computers. Greater computing power and higher capacity I/O subsystems translate into greater expense and the expensive video server, and its associated large-scale storage, are required for all systems, whether there are just a few or as many as twenty or more viewing stations. Even with the extra processing power, each video server can service only a limited number of system computers and, when that number is exceeded (even if only one new computer is added) another expensive server must be added to the system. Thus, the prior art system is not flexible.

Also, because only small numbers of clips are stored in the local storage, a relatively high percentage of the video clips must be retrieved from the server's large-scale storage device. Consequently, much of the processing power of each local computer is devoted to retrieving clips from the server over the LAN. As a result, in prior art designs, each computer could only support one viewing station and the addition of a viewing station necessitated the addition of a computer.

Further, the nature of the demands on the system is such that demand peaks often occur and the potential information transfer rate during these peaks could exceed the capability of one or more system components, leading to interruptions in video clip display. Accordingly, it was not uncommon for a system to be designed with sufficient capacity to accommodate all peak demands so that its components were be underutilized most of the time. Such a system would be unnecessarily expensive.

Since retrieving data stored locally often requires less processing resources than retrieving data from a remote server over a LAN, it is also possible to store copies of all video clips in each local storage. In this case, all data retrieval occurs locally and each computer could support more than one viewing station. But a system which dedicates sufficient mass storage to each computer so that each computer can store all the clips would be prohibitively expensive.

SUMMARY OF THE INVENTION

In accordance with one illustrative embodiment of the invention, a peer-to-peer computer network-based system distributes both the video clip storage and display functions to each computer on the network. The system comprises a plurality of computers, each equipped with a local storage and each capable of controlling several viewing stations. A portion of the total number of video clips is stored in each local store; multiple copies of some of the clips may be stored on different storage devices.

Each computer within the system is capable of acting as both a client and a server: the computer acts as a client when it retrieves a video clip either from its own local storage or from the storage associated with another computer (when the clip is not available from the local store). Each computer acts as a server when it provides a video clip to another computer. Each computer also provides video clips to one or more associated viewing stations in response to viewer requests.

In accordance with an additional embodiment of the invention, resource management facilities are provided which enhance the system operational efficiency while assuring that each video clip is displayed without interruption. These management facilities are distributed throughout the system, with each computer including a local management component which controls its associated resources. These local management components include: mechanisms for allocating local and system resources to prevent video interruptions at high-demand times; video buffers for temporarily storing video clip information to "smooth out the load" over time; and apparatus for altering access to storage devices based on the level of data within any of the video buffers.

More particularly, each allocating mechanism maintains an internal table of the utilization level of each of its critical local system components (disk drive, computer processor, CPU/BUS, LAN adapter, etc.). This table is initiated by loading the table with theoretical or empirical values representing the maximum throughput of each resource. During operation, when a request is made to display a video clip, the allocation mechanism allocates a portion of this maximum throughput value necessary to service that request. During this allocation process, if the internal record indicates that any of the local resources required for servicing the request would be over-committed by an affirmative response, the allocation mechanism causes a rejection of the request. The design of the system is such that display of a video clip is only started when there is a high probability that resources to service the display will be available during the display time so that the video clip display will not over-commit the system. If the resources are not likely to be available for display of a particular clip, then, depending on the existence of duplicate files, the application requesting display can present a display request to another server with a duplicate clip copy, present the same request to the server at a later time or simply return a busy indication to the viewer. This allocation mechanism does not guarantee resource availability because the bandwidth capacity of resources and the data throughput requirements are time averages or estimates, but it does reduce availability problems significantly.

Each local computer also provides memory for the temporary storage of the video clip segments to be displayed locally. This memory is arranged as a buffer area to permit data to be received at the local computer from either local or remote storage at one rate, maybe even intermittently, and then transferred to a display device at a different rate, necessarily, one which permits uninterrupted viewing.

In accordance with a preferred embodiment, in order to reduce expense, there is not enough memory on each local computer to store an entire video clip. Rather, the invention permits a request-servicing routine to fill its associated buffer to a point which materially reduces the likelihood that the display of its associated video clip will be interrupted for lack of data. Only after the buffer has reached this threshold does the routine begin sending data to a display for presentation to the requesting viewer. To further insure uninterrupted viewing, the invention changes the priority of access to a data source in order to maintain the buffer fill level between two predetermined thresholds.

One of the computers additionally supervises and controls access to the LAN. This computer "manages" the network in the same sense that the other computers manage their local resources—it records the traffic levels on the LAN and, when traffic has reached an upper threshold, rejects any further request that would require resources in excess of the LAN capability.

The resource management facilities contribute to the efficient utilization of all system resources so that, preferably, for a given system configuration, every device within the system would, on average, operate at the same percentage of capacity as every other device within the system. In a system such as this, all resources would be exhausted at the same level of system activity. Accordingly, there would be no bottlenecks nor, equivalently, would there be any localized surplus capacity within the system during full utilization periods. Of course, in an actual system, usage of the system resources depends upon various factors such as the distribution of the clips on the servers, the availability of duplicate clip copies on different servers and the activity pattern of the viewers themselves.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
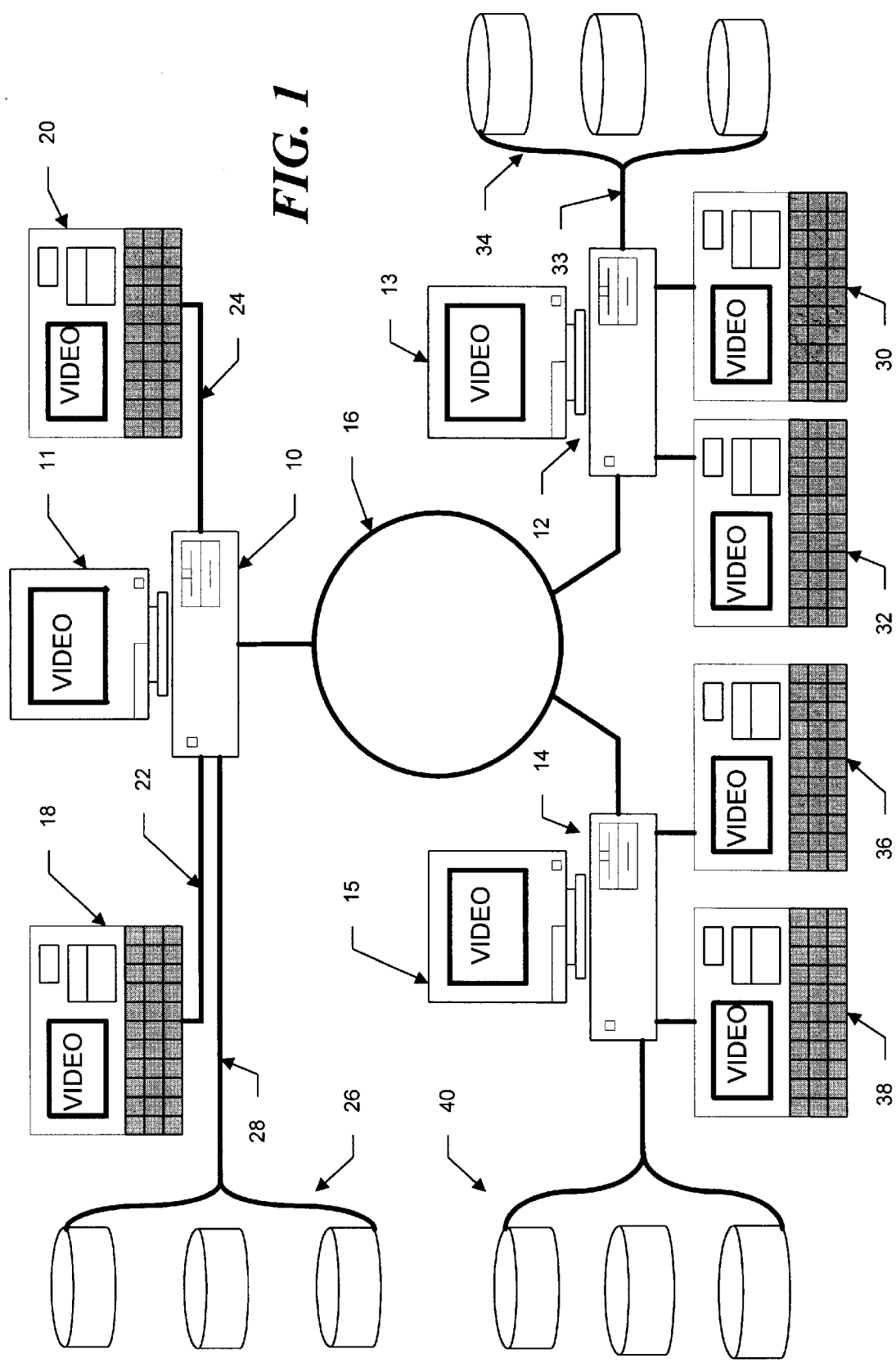
FIG. 1 illustrates one embodiment of the inventive system.

FIG. 1 illustrates one embodiment of the invention which comprises a distributed multi-media presentation system for simultaneously displaying a plurality of video clips on a number of viewing terminals located in a video cassette rental store. The viewing terminals are controlled by computers 10, 12 and 14 that, in turn, communicate, via a network 16. The computer 10 provides an interface to an integral viewing station 11, and to external viewing stations 18 and 20. The computer 10 communicates with the external viewing stations 18 and 20 via their associated communications paths 22 and 24. The computer 10 also provides access to associated "local" storage devices 26 through a communications path 28.

Similarly, the computer 12 supports external viewing stations 30 and 32 in addition to an integral viewing station 13 and provides access to local storage devices 34. The computer 14 supports an integral viewing station 15, external viewing stations 36 and 38 and provides access to local storage devices 40. As is well-known in the art, additional computers may be attached to the network 16.

The video clips are distributed among the various storage devices 26, 34 and 40 on the network 16. In accordance with the principles of the invention, a portion of the total number of clips is stored on each of storage units 26, 34 and 40. Some of the clips may be duplicated on selected storage devices, but, in general, the clips are not duplicated on each of the storage units. There are a number of methods used to distribute the clips among the various storage facilities.

Generally, the numbers of clips stored on each storage facility are not equal and can be optimally determined based on various criteria, for example, the utilization level of the associated system components.

Several factors contribute to the utilization level of the various system components. For example, the capabilities of the processors, disk drives, LAN adapters, etc. located within the computers 10, 12, and 14 may differ, thereby causing the components within a computer to be utilized more or less. Additionally, the number of video clip display requests generated at each computer's viewing station(s) may vary from computer to computer, resulting in varying utilization levels among computers. For an initial allocation of clips between the various storage devices, simplifying assumptions can be made. For example, it can be assumed that an equal number of requests will be initiated at each computer, that each video clip is equally "desirable", that each computer has the same storage capacity, the same processing capability and same LAN adapter capability, and that the video clips are distributed about the system randomly. In this case, the clips can be evenly distributed (the same number of clips stored for a given unit of throughput capability) among the storage devices. In some cases, further efficiency may be realized by distributing the clips unevenly based on point-of-sale displays, computer location relative to the store entrance and other factors described below. Additionally, the clips may be redistributed, at the end of a day for example, in response to the level of viewer demands at each computer.

Even though each viewing station 11, 13, 15, 18, 20, 30, 32, 36 or 38 has only a small fraction of the clips stored in its local storage, each viewing station has access to all of the clips stored throughout the system. For example, the viewing station 18 has access to clips stored on the devices 26 by way of the communications path 22 to computer 10 which, in turn, uses the communications path 28 to access the devices 26. Additionally, the viewing station 18 has access to clips stored on any of the storage devices 34 through the communications path 22 to the computer 10, across the network 16 to computer 12 and, from there, through communications path 33 to the devices 34. Similar paths are provided for all the viewing stations within the system.

In operation, a viewer requests display of a clip using one of the viewing stations such as station 18. An application program within the viewing station's associated computer (e.g. 10 for this example) processes the request and determines where the clip is located. This determination can be made for example by consulting a table in the local storage device which contains the location (machine name and file name) of all clips. If the requested clip is located on a local server and also redundantly on another remote server, a request for the clip is sent to the local server first. If this resource request fails due to a resource limitation (such as local drive capacity) the request is forwarded to the remote server. Once the desired clip is located, the application program initiates retrieval of the clip by instructing the video stream manager to retrieve the clip. If the clip is located on a remote storage device, the requesting or "client" computer passes the request along to the remote computer or "server" which controls the storage device where the clip is located.

The actual tasks of forwarding the request from the client computer to the server computer and servicing the request in the server computer are handled by software entities called "threads" of execution operating in both the client computer and the server computer. The threads interact directly with the computer operating system at a lower software level than the application programs which interact with the viewer.

Threads are well-known in the art and are most commonly associated with multitasking operations, whereby several operations may take place "simultaneously", for example, one thread may write data from a buffer to a display adapter while, at the same time, another thread (responding to a different request) is writing data from a LAN adapter into a different buffer. Many operating systems, such as the OS/2® operating system available from the International Business Machines Corporation of Armonk, N.Y., support multitasking operations and threads of execution. The operation of these threads are described in more detail below.

Figure 2:
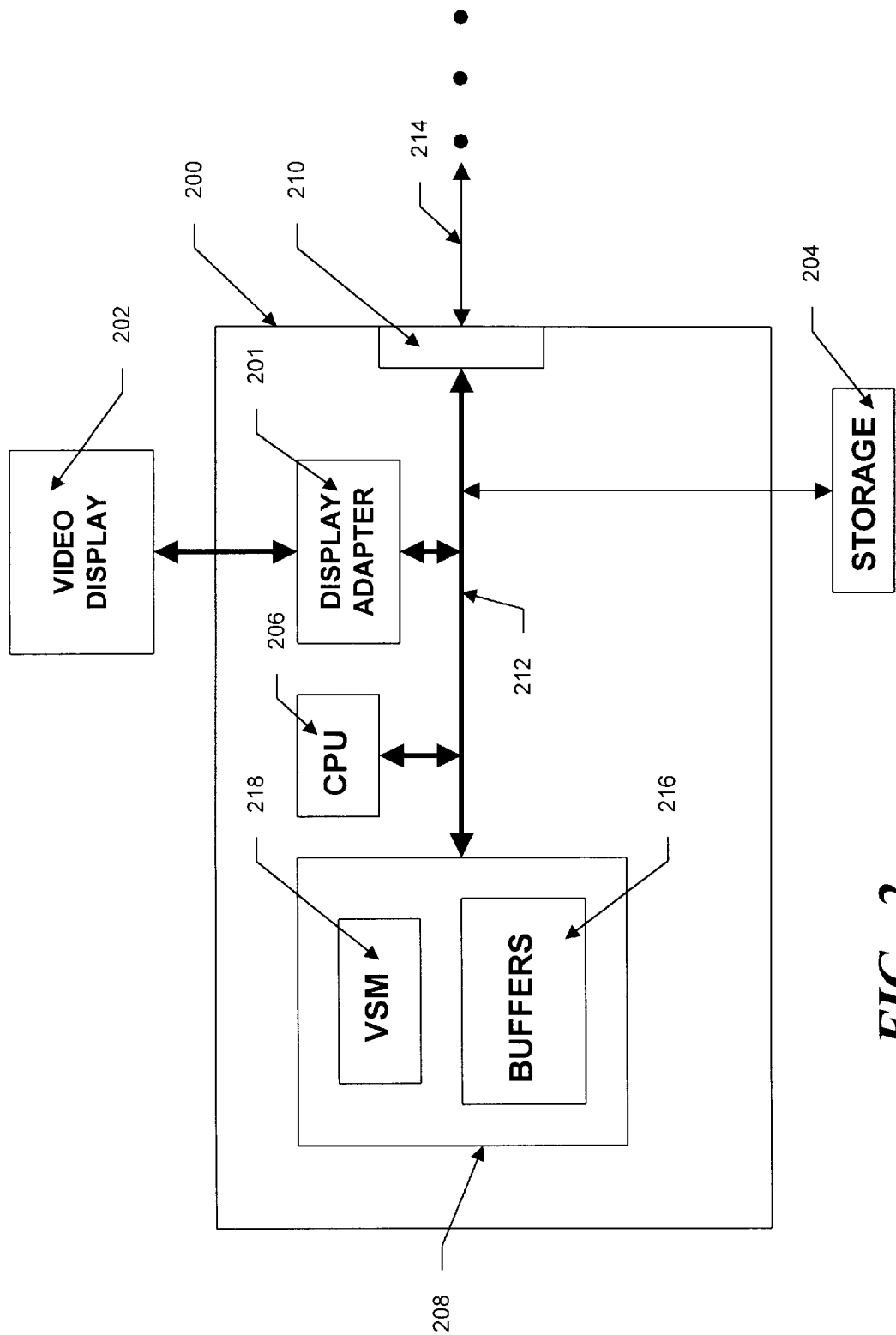
FIG. 2 illustrates some of the internal components found in each computer within the inventive system.

FIG. 2 illustrates a computer 200 which may be any of the system computers 10, 12, and 14. Also illustrated are an associated viewing station 202, a display adapter 201 and a storage device 204. Computer 200 contains a central processing unit (CPU) 206, memory 208, a LAN adapter 210, and a bus 212 through which these and other computer components (not illustrated) communicate data and control information. The CPU 206 controls storing, retrieving and processing information which may reside within memory 208, may be obtained from a local area network 214 through the LAN adapter 210, or may be obtained from the storage device 204. Typically, instructions for operating the computer 200 (comprising the operating system, application programs, etc.) are stored, in whole or in part, within the memory 208. Additionally, the memory 208 contains, as do the memories of all the computers in the system, video stream manager (VSM) buffer(s) 216 and a video stream manager program 218 which will be described in detail hereinafter.

In an exemplary embodiment of the invention access is provided at each viewing station to several thousand forty-five-second video clips (e.g. motion picture previews) stored as a plurality of data segments called "frames". A frame is the amount of data required to display a still picture on a monitor and multiple frames displayed sequentially are used to create the moving video image. Because forty-five seconds of uncompressed full-color, full-motion video requires approximately one gigabyte of storage capacity, the clips are compressed for storage by means of a compression routine which removes redundant information ("lossy" compression can also be employed in which additional information is removed). Due to this compression, the amount of stored information which corresponds to a displayed frame of information may vary widely from frame to frame. For example, the compressed information which corresponds to a frame that contains a large amount of redundant information such as an image of an ocean vista under a clear blue sky would contain a great deal less compressed data than a frame which is filled with an image of a flower garden in full bloom.

Each viewing station's display adapter 201 must decompress the clips before they are presented to viewers at that station and a constant stream of data must be output by the display adapter 201 in order to maintain a steady, thirty-frame-per second frame rate required for smooth video display. Yet, since the information content of the compressed data varies, and, thus, the amount of data in each frame varies, the incoming data rate required to maintain a display at the viewing terminal may fluctuate considerably. Further, the data rate supplied to the computer 200 may also fluctuate due to system resource contention or other factors.

The system therefore employs the VSM buffer(s) 216 to temporarily store portions of video clips which will be displayed on the viewing station 202. The VSM buffers allow the fluctuating data rate of the data retrieval operation to be "matched" with the fluctuating data rate required by the display adapter. More particularly, threads are used to retrieve the data from a storage device, 26, 34, or 40 (see FIG. 1), and write the data into the VSM buffers 216 at a varying rate. Other threads remove the data from the buffers and provide the data to the display adapters. The buffers help to assure that no display is "starved" of data, thus avoiding any interruptions in display of the clips.

Since each of the storage devices 26, 34 and 40 (FIG. 1) are shared, retrieval of data from a given storage device 26, 34, or 40 is prioritized on a first-come, first-served basis; accordingly, each data retrieval thread is assigned a priority level for access to a particular storage device. However, in accordance with the principles of the invention, a data retrieval thread may increase its assigned priority level if the amount of data stored in the VSM buffer 216 into which the thread is delivering data falls below a predetermined threshold indicating that the buffer is likely to become empty.

Figure 3:
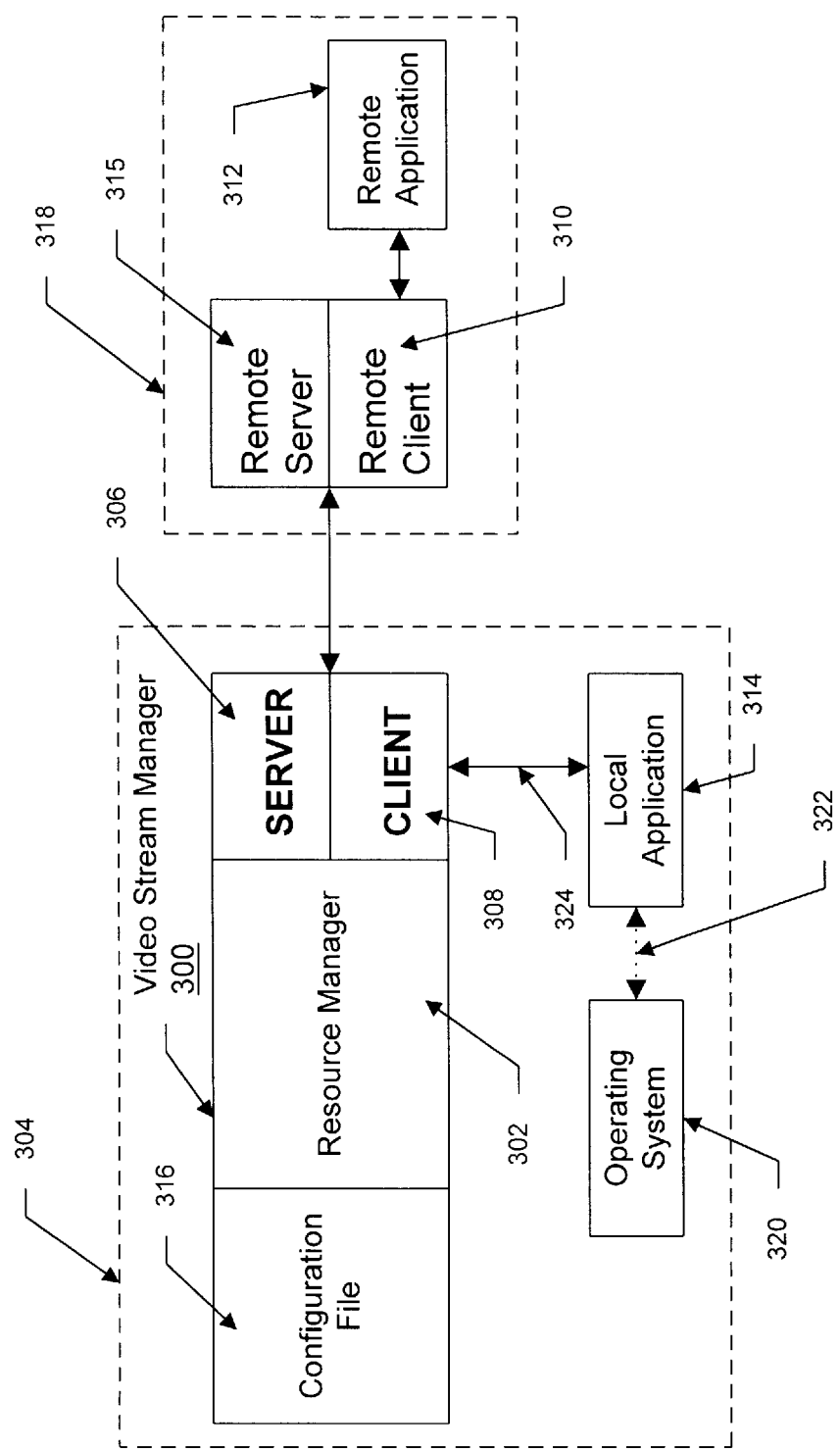
FIG. 3 illustrates the interaction between various components of the invention.

FIG. 3 illustrates the structure of the data handling software found within each of the computers, 10, 12, and 14. For example, a video stream manager program 300, a local application program 314 and an operating system 320 are located in a computer schematically illustrated as dotted box 304. The application program 314 provides a user interface for viewer at the viewing station by interpreting requests from viewing station input devices and displaying video clips on the viewing stations as they are retrieved.

The video stream manager program 300 receives the requests from the application program 314 and, based on the availability of local resources, either accepts or denies the request. If the request is not rejected, and as discussed below, the video stream manager 300 sets up the various threads which actually accomplish the transfer of stored information for the display of the requested clip. The video stream manager 300, in turn, comprises a resource manager program 302, a server thread program 306, and a client thread program 308.

The local resource manager 302, which is replicated on all the computers throughout the system and acts independently of the other local resource managers within the system, responds to the resource requests, thereby recording the usage-level of the local components associated with the computer upon which the resource manager 302 resides. The resource manager 302 rejects a request if granting the request would over-extend any system resource which it controls.

The client thread program 308 responds to a request generated by the application program 314. It determines whether the request is for a locally-stored clip or for a remotely-stored clip. If the clip is stored on a remote storage device, the client thread interacts with a server thread on the remote computer. In each computer a server thread 306 interacts with remote client threads such as remote client thread 310 and remote application programs such as program 312, both of which would be located on a remote computer (schematically illustrated as dotted box 318). The server thread retrieves data stored on the computer's local storage and forwards the retrieved data to the remote computer 318.

As is well-known, threads may be continuously running or may be created to perform a specific task and then deleted once that task is done. In accordance with an exemplary embodiment of the invention, the server threads (e.g. server thread 306) in each computer are created at system initialization and are always running. In this manner, the server threads are already in existence when a remote client thread (e.g. client thread 310) from another computer 318 requests a video clip and system operation is simplified. Similarly, the client threads (e.g. client threads 308 and 310) in each computer are created in response to special initialization commands (discussed in more detail below), perform the requested data transfer operation and, since the application program is always running and ready to accept requests, the client threads are always running.

More particularly, in response to a request from a viewing terminal (not shown) connected to computer 304 for display of a video clip, application program 314 communicates with VSM 300 to cause the creation of the client thread 308 as indicated by dotted arrow 322. The application program then communicates the request to the client thread 308 as indicated by arrow 324. The client thread 308, in turn, determines the location of the clip and requests the allocation of local system resources from the associated resource manager 302. The application program 314 may use a client thread 308 that was created in response to a previous request from the application program 314.

In order to determine whether sufficient resources are available to satisfy the request, the resource manager 302 uses a configuration file 316 which contains configuration information about each system component in the computer 304. That information may, for example, include the data throughput capacity of each local storage device (disk adapter, disk, etc.), the throughput capacity of the LAN adapter and the processing capability of the computer. The contents of the configuration file 316 are used by the resource manager 302 (as described in detail below) to make a decision whether or not to accept the request.

More specifically, when a computer is first installed on the system, the configuration file 316 is created by a system installer or similar personnel (in accordance with another embodiment, if each system component supplies sufficient information, this function could also be performed by system boot-up software). Additionally, the configuration table of the computer which houses the global resource manager will include a figure for the total LAN throughput in its configuration file. The number of data streams that can be simultaneously sent across the LAN is limited by the global resource manager so that the sum of the throughputs required for the respective streams does not exceed the maximum throughput capability of the LAN.

The throughput capability which is stored in the configuration table is generally based on the physical characteristics of each device. For example, the maximum throughput of a computer attached to the network depends, in part, on the speed and type of central processing unit. Similarly, the throughput capability of a disk drive depends on physical characteristics such as seek time, data transfer rate and rotational latency. Because the throughput capacity of a disk drive is, in general, a function of the number of data streams the drive is simultaneously processing, the resource manager 302 monitors both the number of data streams being processed and the throughput capability required for each stream in order to determine the total resource allocation. For example, a disk drive may be able to supply data to five streams at 200 thousand bits per second (Kb/s) each, yielding a total throughput of 1.0 million bits per second (Mb/s). The same drive, due to heavier loading, may only be able to supply data to six streams at 150 Kb/s each, yielding a total throughput of only 0.9 Mb/s.

In order to simplify the calculations, some assumptions may be made, illustratively, one assumption is that all data streams have the same, known rate, in which case the resource manager 302 simply totals the number of streams in operation in order to determine the total allocation. Further, the device throughput capability may be stored in terms of the number of data streams a particular device may be capable of servicing rather than in terms of Kb/s. Data stream throughput figures stored in the configuration table may be obtained empirically, for example, by using actual video clip data streams to benchmark the system components, thus yielding throughput figures based on actual data streams (data streams that do not, generally, exhibit the same data rate).

The information stored in the configuration file is used to make a determination whether to accept or deny a request by comparing a throughput, or data rate, required of each local component in order to display the requested video clip to the table entries to determine if sufficient unallocated throughput capability is available for each required local component. The data rates required for each video clip may be stored, for example, in a portion of memory associated with the resource manager 302. Alternatively, an estimate of the throughput required for each video clip may be stored along with the clip, for example, in the clip header file. A data rate estimate for a particular clip may be, for example, the highest average data rate exhibited for any video buffer length segment of the clip. Alternatively, the estimate may be an average data rate assigned to all the video clips stored within the system. In this latter case, the best estimate would be the highest average data rate exhibited for any fixed-length segment of any of the clips (generally the fixed length would be equal to the length of the video buffers).

In response to the required data rates, the resource manager allocates the portion of the unallocated capability that is required to display each clip. For example, if the requested clip requires one tenth of the processor's total throughput capability, that one-tenth will be allocated to the requested clip. In this case, the processor could retrieve ten clips simultaneously. However, a CDROM attached to the computer may only be capable of supporting access by a single thread. In this latter case, the entire throughput capability of the CDROM must be allocated for a request made for a clip which resides on the CDROM, and, if a subsequent request is made for a clip that also resides on the CDROM, the resource manager 302 will reject the request. When a request is rejected in this manner, client thread 308 relays the rejection to the application program 314. The application program 314 may subsequently retry the request or attempt to retrieve the clip from another computer or another drive on the same computer if it is duplicated there.

If the request is for a clip stored locally, then, after the request has been granted by the resource manager 302, the client thread 308 directly accesses the local storage device (not shown) in a manner described below. If the request is to display a clip located on a storage device associated with a remote computer, the client thread 308, having obtained the location of the clip from the application program, requests an allocation of the overall LAN throughput (this is in addition to the local LAN-adapter throughput) from the computer which serves as the global resource manager. This allocation may be performed, for example, by having client thread 308 request one-half of the required LAN bandwidth from the global resource manager. The other half of the required LAN bandwidth will be requested by the remote computer.

After the request for LAN throughput has been granted as described above, the client thread 308 forwards the request to the appropriate computer over the network. In the remote computer 318 the request is received by a remote server thread 315. The server thread 315, in turn, requests local resources from the resource manager (not shown) in the remote computer, which manager grants or denies the request as described above. If the request for local resources is granted, the remote server thread requests LAN throughput by requesting half of the required LAN bandwidth from the global LAN resource manager as described previously. It should be noted that this allocation process yields a time-averaged allocation. That is, when a resource manager such as manager 302, for example, allocates ten percent of a disk drive throughput to each of ten threads retrieving video clips, each thread will have access to the drive one tenth of the time on average because that is its average rate of consumption (this allocation differs from a time-division-multiplexed system in that the threads are not assigned fixed time slots in which their respective data appears). Although it may appear to the application programs as though the clips are being retrieved from a storage device simultaneously, or in parallel, the drive proceeds sequentially, sending a block of data to one thread, then a subsequent block of data to another thread, etc. until, in this example, a block is sent to each of ten threads. When each thread has received one block of data, a second block is sent to the first thread, another block to the second thread, and so on. However, this order can be altered, as described herein, to prevent a video stream buffer from becoming too empty or from becoming too full. The average data rate of a clip is used by the video stream manager 300 to determine the buffer thresholds which trigger the alteration of this order. Additionally, the average data rate of a requested clip is used by the video stream manager 300 to determine how full a VSM buffer (e.g. buffer 216 in FIG. 2) must be before an application thread 314 begins to send the clip to a viewing station such as station 11 (FIG. 1).

At any point in the allocation process, one of the resource managers may reject a clip retrieval request if the associated resources controlled by the manager are already fully allocated to other clip requests or the unallocated throughput capability is less than that required to display the clip. This "rejection" is passed back along the request chain and causes resources previously allocated to be released. For example, during the allocation process of a request which must be serviced by a remote computer, the global resource manager (not shown) may reject the request because the LAN has insufficient throughput capability to handle the request. In this case, the remote server thread 315 releases the local resources which have been allocated to it. The server thread 315 then passes information back over the network to inform the client thread 308 that the request has been rejected and, in response, the client thread 308 releases the resources which have been allocated to it (both local and LAN resources). In general, whenever a requested allocation is rejected, the thread associated with the rejecting resource manager releases its resources and informs the prior thread in the request chain (if there is one) of the rejection so that the prior thread may also release its resources. Because the request for LAN resources may originate at a local computer, at a remote computer, or it may be "shared" by the two, the server thread and the client thread of both computers may be involved in releasing LAN resources.

In an alternative embodiment of the invention, rather than monitoring the utilization of the LAN and of each processor, each computer has associated with it, in its configuration table 316, a parameter which indicates the maximum number of clip retrieval requests originating from remote computers which the computer can process. Because the value of this parameter will vary in relation to the particular computer, the LAN adapter and the clips available for display, the value of this parameter can be obtained by "bench marking" the computer/LAN adapter using a representative sample of the video clips to be displayed. This approach is simpler than monitoring LAN and processor usage, yet has the desired effect of assuring that LAN and CPU resources are not over-extended. This simplified embodiment, effectively, pre-allocates the local LAN and CPU throughput and is based on the assumptions that all data streams are of the same rate, that all local requests can be serviced without over-committing resources, and that LAN and CPU resources in excess of those required to service local requests may be used to service remote requests. If the total LAN throughput might be exceeded after an initial allocation such as just described, the total number of clips served (distributed to remote computers) by each machine should be reduced.

In addition to the efficiencies obtained by use of the aforementioned resource allocation system, further embodiments of the inventive system can use other optimizing techniques. For example, some operating systems (including the aforementioned OS/2® operating system) maximize disk-drive performance by scheduling disk accesses in a way that minimizes disk-head movement. As an illustration, suppose that three threads are reading sequentially from three files stored on the same disk. Assume further that the first file is on the outer tracks of the disk, the second file is on the inner tracks of the disk and the third file is on tracks between the inner and outer tracks (middle tracks). After reading the first file, the operating system file retrieval routine begins moving the read heads towards the inner tracks to retrieve the second file. While moving the head between the outer and inner tracks, many file routines will stop the read heads at the middle tracks to retrieve the third file data if there is a request pending for that data.

As a result of this optimization technique, threads which request data stored on the inner or the outer tracks are disadvantaged relative to threads which request data from the middle tracks because these latter threads will receive data when the read heads are moving both from the inner to outer tracks and from the outer to the inner tracks. Consequently, in order to provide approximately equal access to the disk for all threads, and thus ensure that no thread is starved of data, the resource manager 302 generally serializes (prioritizes on a first-in, first-out basis) all read requests. That is, while a read request from a thread is being serviced by retrieving data from a disk, the resource manager 302 holds all other read requests that require data from the same disk. Thus, during a data retrieval operation, the operating system (at least the file-scheduling portion of the operating system) is unaware of other data requests which would otherwise cause it to read from the middle tracks of a disk nearly twice as frequently as it would from the inner or outer tracks. Since the operating system schedules disk accesses to minimize disk-head movement, circumventing this scheduling may reduce disk performance. Therefore, disk "read-ahead" buffers will usually be employed to alleviate any potential performance losses. If the disk has the existing capability of performing read ahead buffering for multiple streams, circumventing the operating systems optimization does not appreciably affect disk performance. In those circumstances where the drive has insufficient read ahead capabilities, the disk cache memory can be used for read ahead buffering.

More specifically, some disk storage devices are equipped with "tunable" hardware cache memory. The cache memory typically comprises a relatively small capacity, high-speed, memory in addition to the disk storage which typically comprises several magnetic disks which rotate at high speed and are read by movable heads. Since the cache memory exhibits a much shorter access time than the disk memory, it is used to temporarily store information read from the disk and written to the disk, which stored information can then be rapidly retrieved while the disk heads are moving to another position.

A further embodiment of the invention provides additional efficiency by operating the cache memory as one or more "read-ahead" buffers. The number of read ahead buffers, each of which reads ahead in a separate stream, is determined by the average number of streams the drive can support as long as the size of each of these buffers is set equal to, or greater than, the data transfer block size. The read-ahead buffers take advantage of the sequential nature of multimedia data by permitting a disk which might otherwise be idle during the transfer of a block of data to a remote computer to move the next sequential data block of a file into the cache memory. A subsequent request for the cached block then retrieves the block from the cache memory rather than directly from the disk and thus avoids the disk seek and latency time.

There are various ways to implement the read ahead buffers in a conventional tunable cache memory. For example, the cache memory may be used as a conventional cache until a disk read operation does not locate the desired data in the cache (there is a cache "miss"). The disk controller may, in this case, read two (or more) sequential blocks of data from the disk. The first block is used to cover the cache miss and the data retrieved from this block is passed directly to a requesting thread. The second (third, fourth, etc., .) data block remains in the cache memory as a "read-ahead" block. In this manner, when the requesting thread makes its next data retrieval request, the requested block of data will already be in the cache memory. In addition, the read-ahead method may read additional blocks into the cache memory if there are no pending requests and already-read blocks can be replaced.

In addition to the aforementioned bandwidth allocation functions, the resource manager 302 employs well-known operating system semaphores (illustratively used in the aforementioned OS/2® operating system), to establish data retrieval, or access, priorities in the case of simultaneous or nearly simultaneous data retrieval requests from, for example, client thread 308 and other client or server threads not shown. More specifically, semaphores typically act as "locks" to prevent access to a device that is in use. In a disk read operation, a thread (e.g. client thread 308) which has already received an appropriate allocation of resources from the bandwidth allocation portion of resource manager 302 must, prior to reading a block from the disk, request access from the access management portion of Resource Manager 302 and receive access permission. The thread must also release the access when the read is complete. This operation allows the Resource Manager 302 to coordinate the current priorities of competing threads. If threads have the same priority, the Resource Manager 302 effectively grants access in the order that the requests for access are received. If a thread has a higher priority, it is given access ahead of other pending requests for access. The priority of a thread is, in turn, determined by the level of its buffer.

More specifically, in one embodiment of the invention running under the aforementioned OS/2® operating system, when a read request is granted (resources are allocated) by the resource manager 302, before the disk can actually be accessed, the resource manager 302 requires the client thread 308 to acquire a resource semaphore from the operating system. Thus, in this embodiment, the resource manager 302 employs existing operating system scheduling facilities to serialize and prioritize client access to data resources by thread 308 (and other client threads not shown). In this example, the priority of each thread is used to indicate a degree of need and the semaphore is granted to the highest priority thread. In the case where two or more threads have the same priority, they are granted the semaphore sequentially.

It should be noted that the file-scheduling component normally running in the operating system will be "unaware" of requests for the semaphore by the multiple threads and, therefore, the serialization imposed by the semaphore will defeat the normal read sequencing (which minimizes read head travel).

In accordance with the principles of the invention, in certain situations, operating system scheduling facilities can be employed by the threads to temporarily alter the data retrieval priorities. This priority alteration permits a client thread 308 to elevate its priority to a level above that of other threads in the resource manager 302 serialization scheme for a short time. As an example, it may be advantageous for a thread to elevate its data retrieval priority if its associated video buffer memory reaches a low threshold indicating that the buffer is becoming empty. The elevated priority increases the data flow into the buffer and insures that the buffer will not be "starved" of data and result in a breakup of the display.

Illustratively, a client thread 308 which requires data more urgently than other threads (as described in more detail in association with FIG. 4) may use a higher-priority level which is recognized by the operating system to obtain the disk-access semaphore before other threads waiting to acquire the semaphore. Thus, the higher-priority thread, because it acquires the semaphore before the other threads, obtains access to the disk without waiting for other requests to be served.

In accordance with the principles of the invention, in order to increase the efficiency of video clip retrieval from a disk storage device where the data is stored in "sectors", a configuration parameter is used to maintain data transfer block size as large as possible. More specifically, as noted above, although the data is described as being "streamed" from the storage devices to the video buffers, the data is actually retrieved in fixed size blocks. The size of a block may be limited by the LAN, the file system or the operating system but, in accordance with the principles of the invention, the data transfer block size is set to a common multiple of the LAN transfer block size and the disk sector size. Additionally, the inventive data retrieval routines read a partial block of data first, when necessary, in order to force subsequent block reads to begin on disk-sector boundaries. By maximizing the block size and forcing reads to begin on disk-sector boundaries, a system designed in accordance with the principles of the invention reduces the number of read operations and, thereby, increases the efficiency of retrieving a video clip from a disk storage device.

Figure 4:
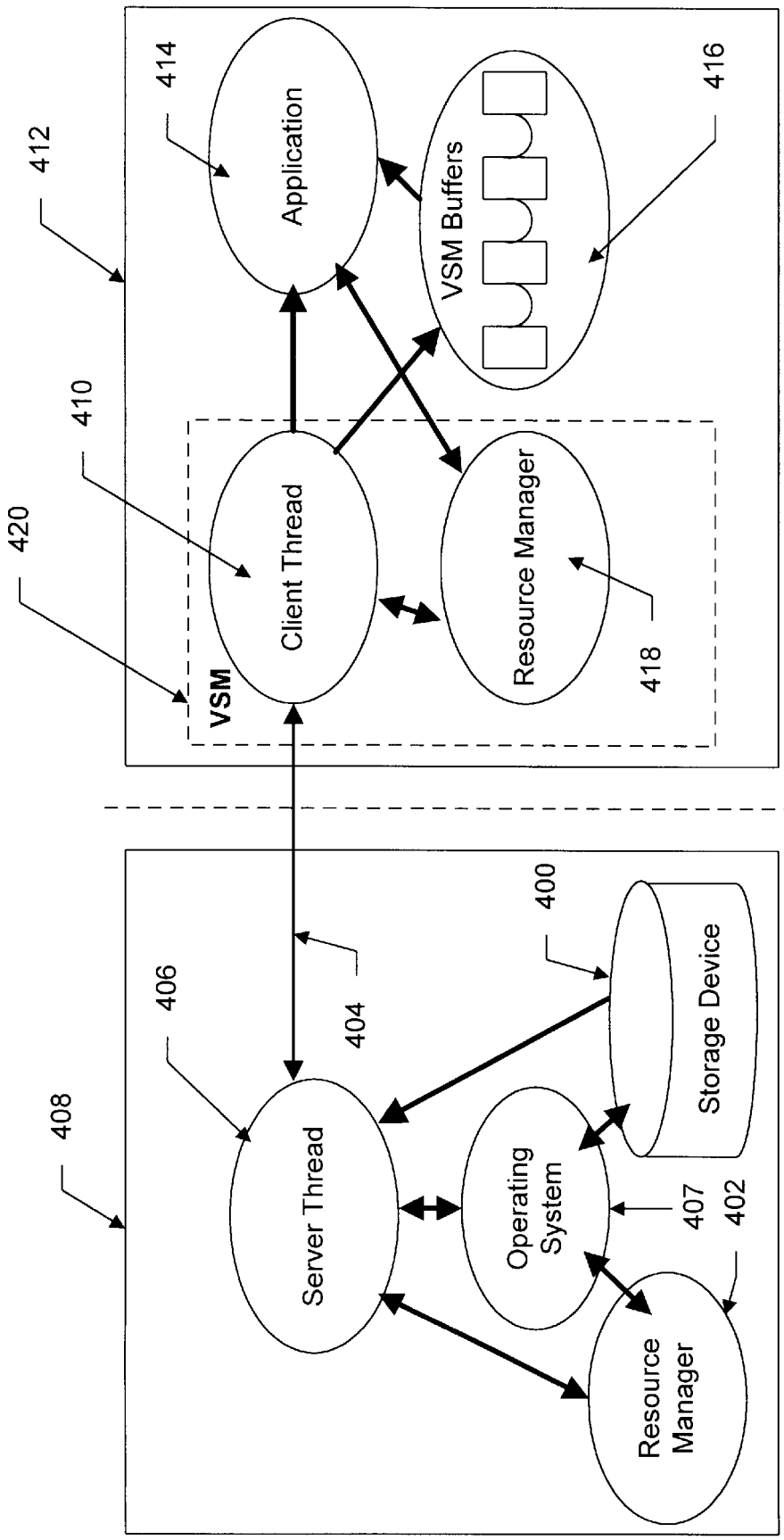
FIG. 4 illustrates the operation of the invention in a situation where an application running on one computer obtains data from a remote storage device.
Figure 5A:
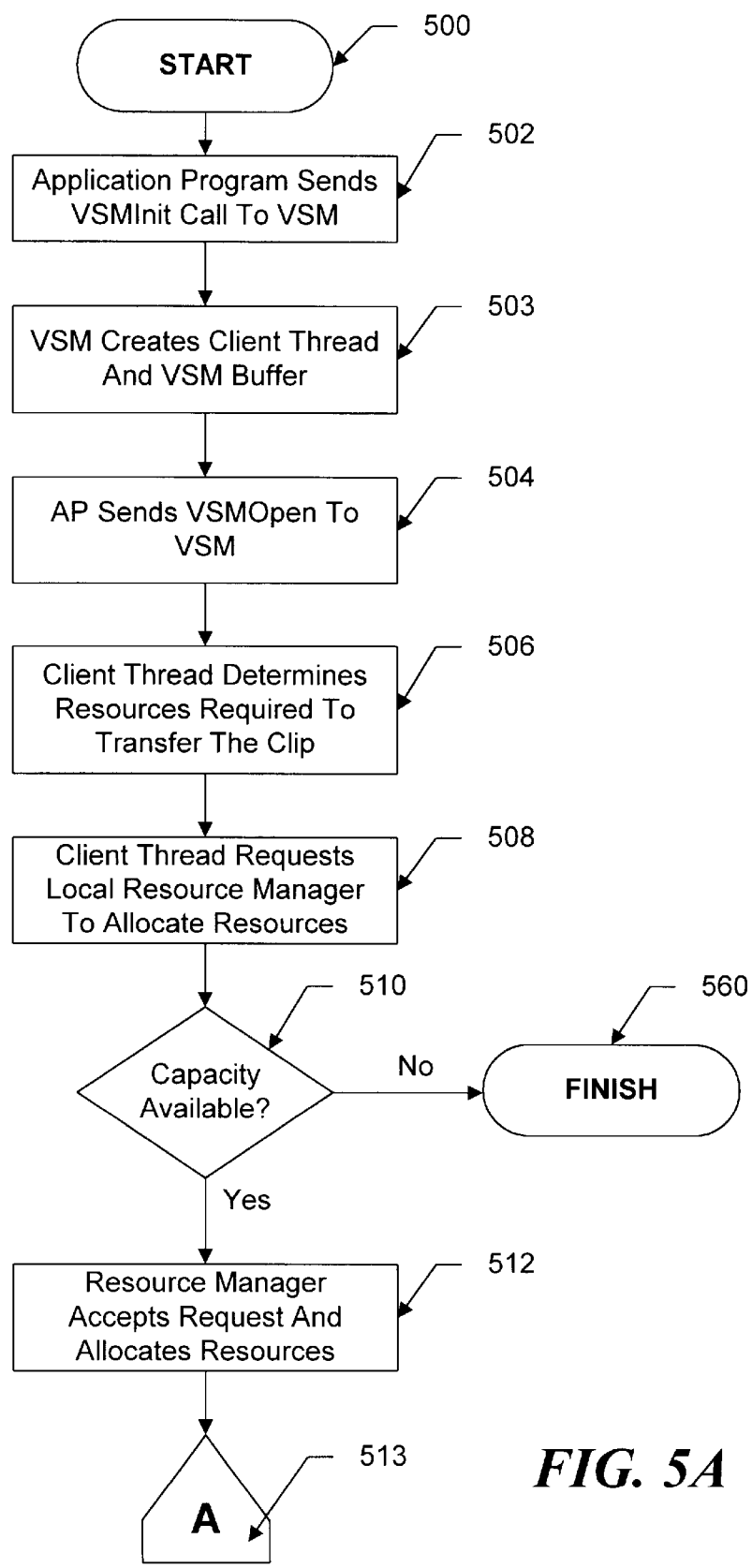
FIGS. 5A–5D illustrate the sequence of operations for setting up a connection and retrieving a video clip in accordance with the invention.
Figure 5B:
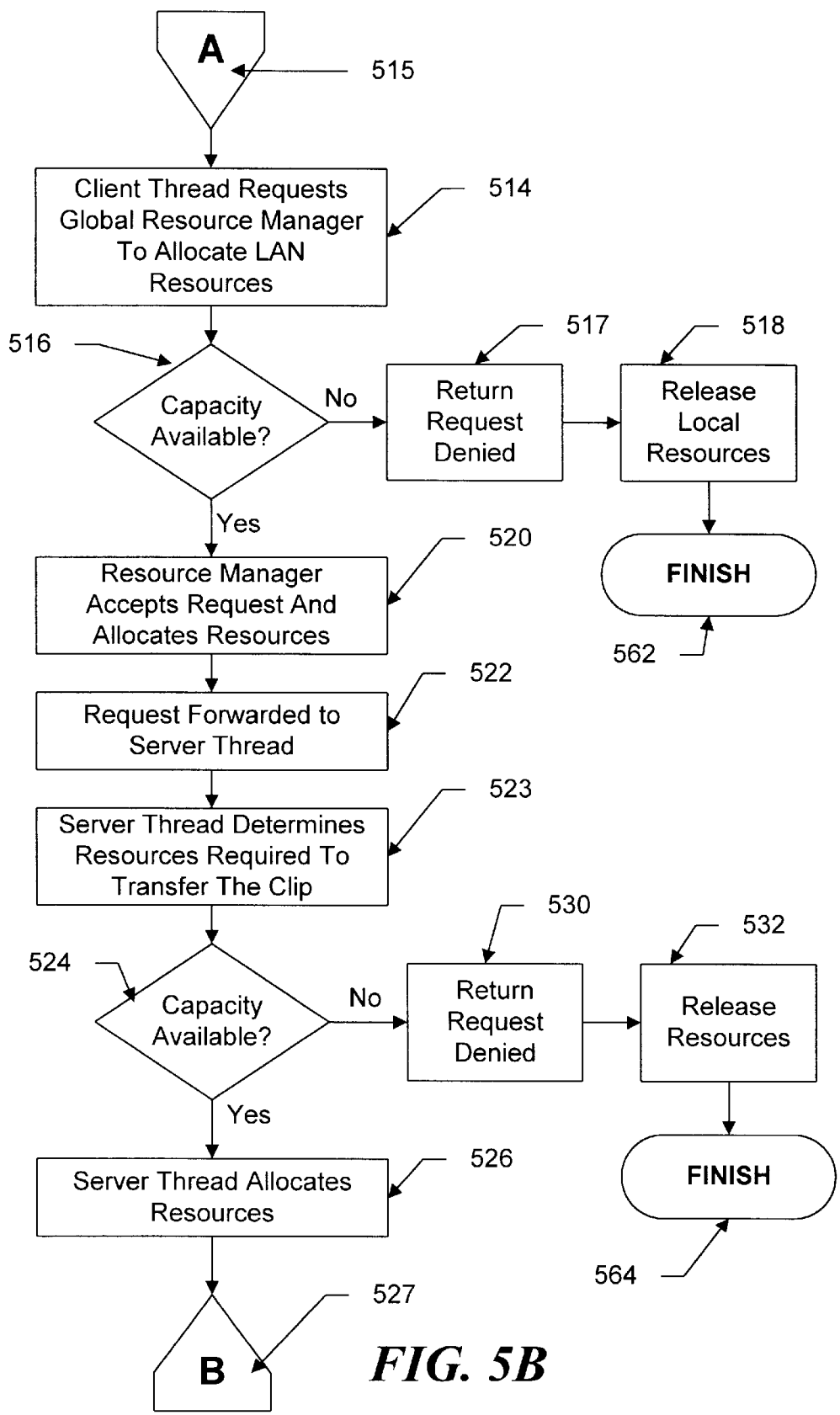
Figure 5C:
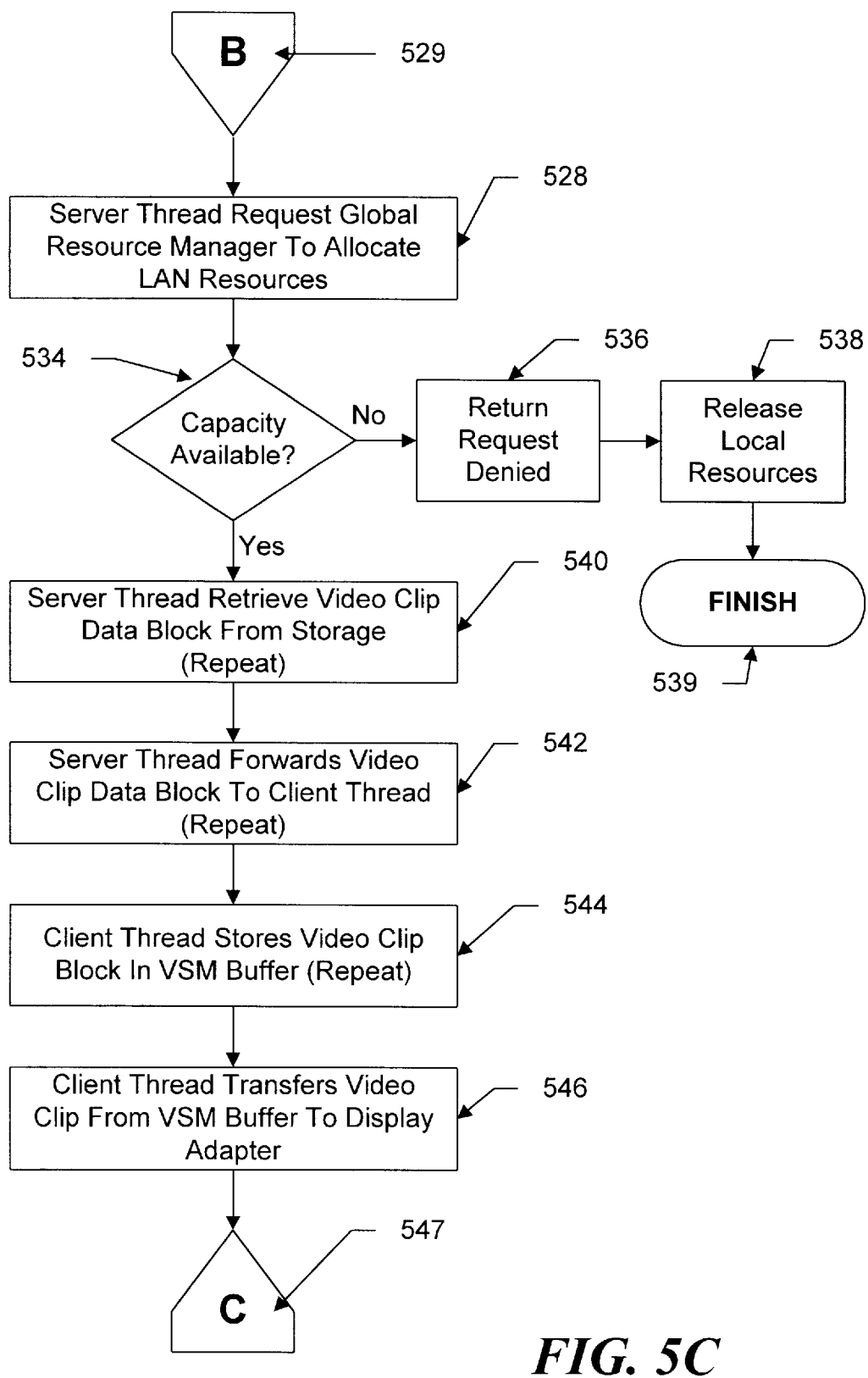
Figure 5D:
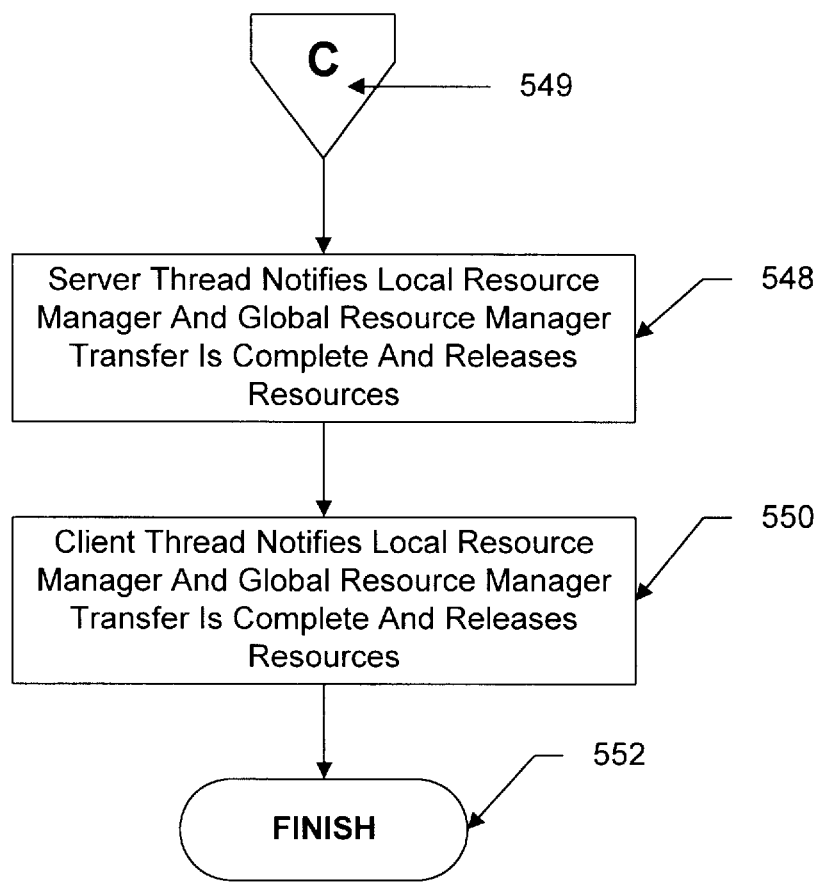

FIG. 4 illustrates a more detailed example of a video clip retrieval in accordance with one embodiment of the invention wherein an application program 414 on one computer 412 retrieves a video clip from a storage device 400 located on another computer 408. The storage device 400 of this figure could be, for example any one of the storage devices 26, 34, or 40 of FIG. 1. Both computers 408 and 412 also include resource managers 402 and 418 which are constructed and operate as described in connection with FIG. 3.

In computers 408 and 412, a well-known operating system software module (for example, a NETBIOS® module which is a part of the aforementioned OS/2® operating system) effects transfers to and from the network 404 to communicate data and commands among computers 408 and 412. In this example, a server thread 406 is created in computer 408 at system initialization and, together with resource manager 402, controls access to storage device 400 (additional server threads, not shown, may also be created at system initialization). A client thread 410 is created on computer 412 in response to requests from application program 414. The client thread 410 controls the transfer of information from computer 408 to application program 414 through VSM buffers 416. Client thread 410 together with resource manager 418 are part of the video stream manager 420 in computer 412.

Illustratively, the application program 414 interacts with the operating system, video stream manager software 420 and the client thread 410 by means of function calls including, e.g., VSMInit, VSMOpen, VSMGet, VSMClose and VSMFree function calls. These function calls control the setup of a network connection between the application program 414 and the storage device 400 and cause the desired clip to be retrieved.

The sequence of operations in setting up a connection and retrieving a video clip are shown in detail in FIGS. 5A–5D. In particular, application program 414 begins a data retrieval operation in accordance with the routine shown in FIGS. 5A–5D in step 500. In step 502, the application program 414 communicates with the video stream manager (VSM) 420 and causes the creation of a client thread and VSM buffers (step 503) with a VSMinit call to the VSM 420. The VSMInit call has arguments including the size of the VSM buffers 416, the transfer block size, and a timeout parameter which indicates the time the client thread 410 should wait for the application program to remove data from a full VSM buffer 416.

In step 504, the application program 414 then attempts to begin the video clip retrieval operation by issuing a VSMOpen call to the video stream manager 420. The VSMOpen call includes as arguments, the machine name where the desired clip is located, and the drive, path and file name of the clip file. The application program 414 may obtain these arguments, for example, from a table (stored in each computer on the system) which records and updates the location of all the video clips stored within the system.

In response to the VSMOpen call, the client thread 410, in step 506, thereupon determines the resources (e.g., CPU bandwidth, or throughput capability, disk throughput, LAN throughput, etc.) required to transfer the clip from the storage mechanism to the VSM buffer 416. The resource bandwidths may be obtained from the VSM configuration file and the video clip required data rate may be determined from the clip file header or from the configuration file. In step 508, the client thread then requests from the resource manager 418 an allocation of the portion of each local resource required to process the video clip.

In accordance with one exemplary embodiment, in order to simplify the management of computer resources, all clips are assumed to require the same data rate. This assumption provides a good approximation to the actual required data rates in most cases but if, for some reason, some clips are more amenable to compression than others, better performance would be obtained by assigning data rate requirements on a clip-by-clip basis.

If the requested local resource capacity is available, as determined in step 510, resource manager 418 accepts the request (step 512) and notifies the client thread 410. If the resources are not available, then the retrieval operation is terminated and the routine proceeds to finish in step 560 where the application program 414 is notified of the termination by a return code from VSMopen. If the local resources are available, the routine proceeds, via off-page connectors 513 and 515, to step 514 where the client thread 410 forwards a request to the global resource manager (not shown) over the network 404 to request allocation of LAN resources. As previously mentioned, in accordance with the principles of the invention, one-half of the actual LAN resources necessary to transfer the clip information are requested by client thread 410.

If the requested LAN resources are not available, as determined in step 516, then a request denied message is returned from the global resource manager to both the client thread 410 and the application thread 414 in step 517. In response, the client thread 410 instructs the resource manager 418 to release the previously-allocated local resources in step 518. The retrieval operation is then terminated and the routine proceeds to finish in step 562.

Alternatively, if the requested LAN resources are available, the global resource manager returns a request accepted message to client thread 410 in step 520. In response, client thread 410 (step 522) uses the clip location information to send a clip retrieval request over network 404 to the server thread 406 in computer 408. As discussed above, in this exemplary embodiment, server threads are created at system initialization and thus server thread 406 is in existence and can receive the incoming clip retrieval request.

Server thread 406 determines the video clip data rate, and the resources required to transfer the clip, from the incoming clip retrieval request in step 523 and, in step 524, interacts with resource manager 402 to request allocation of each local resource (in computer 408) required to process the video clip retrieval request. In step 526, the resource manager 402 allocates local resources if they are available and notifies the server thread 406.

Alternatively, if, as determined in step 524, local server resources are not available, then, in step 530, the server thread returns a request denied message to the client thread and, in response, the client thread releases the local and global resources it previously allocated and the routine ends in step 564.

Assuming local resources are available, the rotine proceeds, via off-page connectors 527 and 529, to step 528 where server thread 406 then sends a request over the network 404 to the global resource manager (not shown) to request allocation of sufficient LAN resources to service the request. (As previously noted, this latter request is for one-half the resources actually needed to service the request with the other half having been already requested by client thread 410.)

If the LAN resources are not available as determined in step 534, then a request denied message is returned from the global resource manager to the server thread 406 in step 536. The server thread, in turn, informs resource manager 402, which thereupon releases the local resources of computer 408 (step 538) which resources were previously allocated. In addition, server thread 406 returns a request denied message to client thread 410, causing it to inform resource manager 418 of the denial. Resource manager 418 thereupon releases the allocated local resources in computer 412 and the global LAN resources allocated in response to the request from client thread 410. The retrieval operation is then terminated and the routine proceeds to finish in step 539.

Alternatively, if the LAN resources are available, a request granted message is returned from the global resource manager and the server thread 406 begins to retrieve data from the storage device 400 in step 540 and send that data to the client thread 410 in step 542. Application program 414 can either open and begin streaming the clip from storage device 400 (reading the contents sequentially without further direct interaction between the client thread and itself) from a given location in the file or it may open the clip file, perform some random access reads and then begin streaming. Data streaming form a predetermined location is effected for those clips which contain all control information necessary for the transfer in a header at the beginning of the clip file. In this case a client thread 410 can be used to retrieve the clip information. Alternatively, some initial random access reads are used when the application program 414 must read through various locations within the file to obtain all the control information because all the control information is not located in the clip header. After the required control information is obtained the remainder of the clip is streamed.

In addition to allocating system resources, as previously mentioned, resource manager 402 controls access to the disk resource in order to help assure that the threads do not starve. This is done by requiring threads to call the resource manager and request permission before reading from the disk and to call again after the read is complete to inform the resource manager. The resource manager 402 serializes the threads and releases block read requests from the threads to the storage device 400 in sequence to insure that each thread receives equal access to the storage device 400 (as discussed above, a thread may take on a higher priority). More specifically, resource manager 402 permits a server thread 406 to obtain a block of data from a storage device 400 by presenting a block-read request generated by the server thread 406 to the operating system 407. In response to the block-read request, when the storage device 400 is free, the operating system 407 yields a semaphore (not shown) to the server thread 406 which semaphore is held by the thread 406 until the thread obtains the requested block of data from the storage device, at which time the semaphore is released.

Data blocks retrieved from the storage device 400 are forwarded to the network 404 by the aforementioned network modules. Network modules are also used by the client thread 410 to read the incoming data from the network 404. The client thread then stores the clip data in the VSM buffer 416 (step 544). Server thread 406 repeatedly acquires and releases access to the storage device 400 until the entire video clip is retrieved. Data transfer in this fashion continues without intervention by the application program until the VSM buffer 416 fills to a threshold determined by the amount of data already buffered, the average rate at which the buffer is filling, and the play rate of the clip.

The application program 414 begins, in step 546, the transfer of data from the buffer 416 to the video adapter (not shown) by issuing a VSMGet function call and, when the predetermined buffer threshold is reached, the application program begins playing the stream. The VSMGet function call includes as arguments the amount of data to transfer and the maximum time the application will wait to retrieve data. The call returns a pointer to the data in the buffer, and the amount of data which is currently available. When the application program 414 has transferred sufficient data in the buffer 416 to a video adapter, the application program 414 releases the portion of the buffer which was occupied by the transferred data by issuing a VSMFree function call to the buffer 416, which function call identifies the buffer section that has been released. As should be apparent, because steps 540–544 are repeated and, as just described, step 546 begins when the VSM buffer reaches a threshold, all of steps 540–546 may be executing simultaneously.

It should be noted that the client thread 410 does not copy the clip data from buffer 416 into a separate memory area set aside for the application program 414. Instead, the VSM 218 provides a pointer to data (and an indication of the extent of the data) that the application program 414 can pass to the display adapter (not shown) so that the display adapter (or supporting software) can copy the clip data directly from the VSM buffer 416 to the display adapter memory.

When all the video clip data has been transferred to the video adapter or when the data is no longer desired (e.g. a viewer requests a different clip before the current clip has been completely shown), the application 414 terminates the video stream by issuing a VSMClose function call. This function call permits the computer to "clean up" any leftover data and prepare for the next video clip request.

When the clip data retrieval has been transferred over NETBIOS®, the routine proceeds, via off-page connectors 547 and 549, to step 548 where the server thread 406 releases the local resources in computer 408 by informing resource manager 402 that the clip data retrieval request has been serviced. In step 550, the client thread 410 releases the local resources in computer 412 by informing its resource manager 418 that the request has been satisfied and finally in step 552, the application program 414 terminates the operation by calling a VSMClose function.

Figure 6:
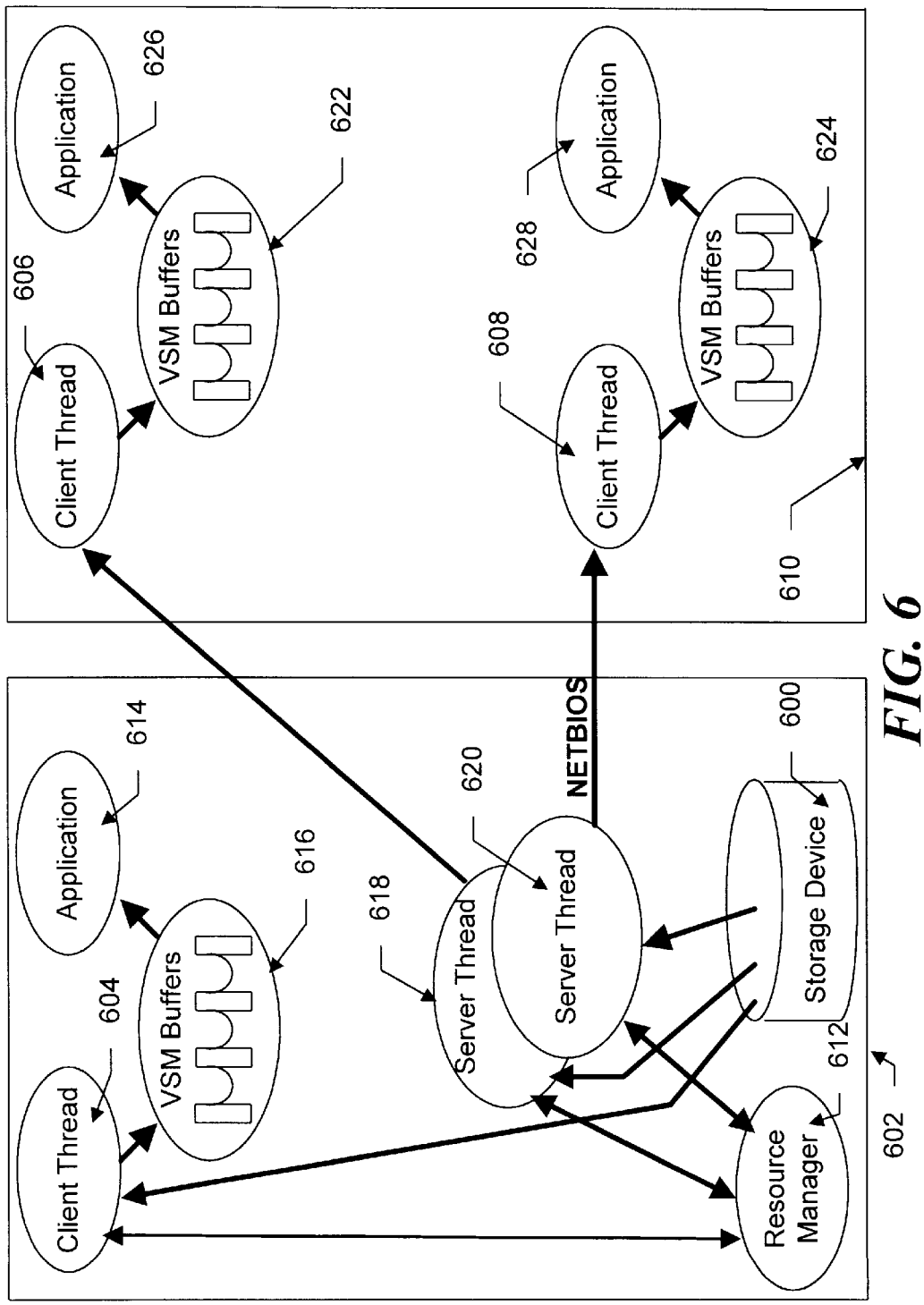
FIG. 6 illustrates the operation of the invention in a situation where an application running on one computer obtains data from a local storage device and two other applications running on remote computers obtain data from the storage device.

FIG. 6 is an exemplary illustration of a situation where three client threads, 604, 606 and 608, are streaming video clip data from a single storage device 600 which is associated with a computer 602. Also associated with computer 602 is a resource manager 612. Client thread 604 is initiated from the computer 602 and client threads 606 and 608 are initiated from another computer 610. Because client thread 604 is initiated from computer 602 which is associated with storage device 600, it can directly access the storage device 600 without involving a server thread on the same computer. During this latter access process, the client thread 604 utilizes resource manager 612 to obtain and serialize its access to the storage device 600. Clip information retrieved from device 600 is passed to application program 614 via buffers 616. Application program 614 and buffers 616 operate in the same manner as the buffer 416 described in relation to the discussion of FIG. 4.

Because the client threads 606 and 608 are not initiated from the computer 602 associated with storage device 600, two separate server threads, 618 and 620, are used to service the incoming data requests from client threads 606 and 608, respectively. The buffers 622 and 624 and application programs 626 and 628 operate in an analogous fashion to previously-discussed application program 414 and buffer 416, respectively. The mechanism for creating each of the pathways between the respective client threads and the associated server thread are equivalent to the mechanism for creating a single pathway as illustrated in FIG. 4.

Because, in this latter illustrative embodiment, system component throughput values stored in the configuration table are estimates and because process data requirements will vary, the invention permits a process to momentarily "steal" resources by exceeding the utilization of resources allocated to it. Such a situation may occur, for example, when the data rate required to read data from a VSM buffer and write it into a video adapter temporarily exceeds the average data rate which is assigned to the associated video clip. Additionally, by means of the priority mechanism described in relation to FIG. 3, the client threads associated with buffers 616, 622 and 624 may change their own storage device access priority levels using operating system functions well known in the art based on the data level in their associated buffers.

More particularly, the buffer thresholds are assigned according to the data requirements of a particular process. For example, a particular video clip data file may include less data and, concomitantly, a lower data transfer rate because it has been compressed more than other clip files. Therefore the buffer threshold for the transfer buffer associated with the data transfer process would be set lower than the transfer buffer threshold of another file which exhibits less compression. The client threads 604, 606 and 608 monitor the data level in the buffers 616, 622 and 624, respectively. As described above, when a buffer data level reaches a low threshold, the client thread elevates its priority above the priority of those threads whose buffers are not depleted beyond a threshold level. This elevated priority insures that an increased data flow results. When the corresponding buffer data level increases above a low threshold, the client thread issues an operating system command which returns the client thread priority to its normal value. In addition, if a stream surpasses a high threshold, its priority is lowered, until the level returns to the normal range.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A computer network system for storing and displaying video multimedia data clips, said system comprising:
   a plurality of computers, each computer having at least one storage device coupled thereto for storing a portion of said multimedia data clips;
   display means for displaying said video multimedia data clips;
   a computer network;
   interconnecting resources for connecting each of said plurality of computers to said computer network, said interconnecting resources comprising data buffers for storing the digital information in said video multimedia data clips;
   client means in each of the plurality of computers for retrieving video multimedia data clips from the local storage device coupled thereto and for sending requests for said video multimedia data clips over the computer network to other of said plurality of computer;
   server means in each of the plurality of computers responsive to requests from other of said plurality of computers for providing one of the video multimedia data clips over the computer network to another of said computers making said requests;
   local management means in each of said plurality of computers for allocating said interconnecting resources and for refusing one of said requests to prevent said data buffers from becoming overloaded during display of one of said video multimedia data clips; to prevent said interconnecting resources from becoming overloaded during display of one of said video multimedia data clips each of the plurality of computers capable of retrieving and providing video multimedia data clips over the computer network and for retrieving video multimedia data clips from the local storage device coupled thereto.

2. The computer network system of claim 1 wherein said display means comprises at least one viewing station, coupled to each computer, for displaying said retrieved video multimedia data clips.

3. The computer network system of claim 2 wherein said interconnecting means comprise:
   a processor;
   a network adapter controlled by said processor; and
   means controlled by said processor for transferring said video multimedia data clips between said computer network and said data buffers.

4. The network system of claim 3 wherein said local management means comprises means for monitoring usage of said interconnecting means and means for causing said server means to refuse said request when an amount of said digital information stored in said data buffers reaches a predetermined threshold.

5. A multimedia storage and presentation system for storing video clips, each clip comprising a plurality of segments, and for displaying said video clips in response to requests by viewers, said system comprising:
   a computer area network;
   a plurality of computers connected to said computer network, each computer having attached thereto at least one storage device at least one viewing station, input means for allowing said viewers to request display of a specific video clip on said at least one viewing station and buffer means for temporarily storing segments of said specific video clip prior to display;
   client means in each of the plurality of computers for retrieving one of the video clips from the local storage device coupled thereto and for sending a request for one of said video clips over the computer network to other of said plurality of computers;
   server means in each of said plurality of computers responsive to said request for retrieving said specific video clip from selected storage device coupled to said computer, said server means having a predetermined maximum retrieval capacity;
   means cooperating with said server means in one of said plurality of computers for monitoring said buffer means in said one of said plurality of computers coupled to said network to determine a number of video clip segments retrieved from said selected storage device; and stored in said buffer means; and
   means responsive to said number of video clip segments stored in said buffer means and to said maximum retrieval capacity for controlling said client means and said server means to refuse said viewer request to display said specific video clip when said maximum retrieval capacity would be exceeded or said number of said video clip segments stored in said buffer means exceeds a predetermined threshold.

6. In multimedia storage and presentation system for storing video clips, each video clip comprising a plurality of segments, and for displaying said video clips in response to requests by viewers interacting with a computer system the system including a network, a plurality of computers connected to said network, each computer having attached thereto at least one local storage device for storing some of said video clips for distribution thereto and to other of the computers connected to said network, at least one viewing station, input means for allowing said viewers to request display of a specific video clip on said at least one viewing station and buffer means for temporarily storing segments of said specific video clip prior to display, a method of accessing video clips comprising the steps of:

A. in response to a view of request a viewer request for a specific video clip receiving by one of the computers coupled to the network, locating said specific video clip in the at least one local storage device attached to said one computer;

B. if said specific video clip is not found in said at least one local storage device attached to said one computer, locating another of said plurality of computers having attached thereto a selected storage device containing said specific video clip;

C. retrieving said specific video clip from said selected storage device in said another of said plurality of computers coupled to said network over a path having a predetermined maximum retrieval capacity;

D. monitoring said buffer means in said another of said plurality of computers coupled to said network to determine a number of video clip segments retrieved from said selected storage device and stored in said buffer means; and E. refusing said viewer request to display said specific video clip when said maximum retrieval capacity would be exceeded during step C or said number of said video clip segments stored in said buffer means exceeds a predetermined threshold.

7. The method of claim 6 wherein step E comprises the steps of:

E1. identifying data transfer resources involved in the data retrieval of step C;

E2. determining a maximum capacity of each data transfer resource identified in step E1;

E3. determining an average data capacity of each resource identified in step E1 involved in the data retrieval of step B; and E4. reducing the maximum capacity determined in step E2 by the average data capacity determined in step E3.

8. The method of claim 7 wherein step E2 comprises the step of:

E2A. maintaining a configuration table having contents relating to performance characteristics of each resource needed to display said specific video clip.

9. The method of claim 8 wherein the step E2 further comprises the steps of:

E2B. recording total resource utilization; and

E2C. comparing the total resource utilization with performance characteristics stored in said configuration table.

10. The method of claim 9 wherein step E2C comprises the steps of:

E2C1. identifying a data transfer resource having the least available capacity at the time of a viewer request; and E2C2. comparing the utilization of the resource identified in step E2C1 with performance characteristics stored in said configuration table.

* * * * *